(12) United States Patent
Evans et al.

(10) Patent No.: US 10,818,091 B2
(45) Date of Patent: Oct. 27, 2020

(54) VISUALIZATION SYSTEM FOR AN AIRCRAFT USING LIDAR POINT CLOUD MODEL

(71) Applicant: The Boeing Company, Chicago, IL (US)

(72) Inventors: Nick S. Evans, Lynnwood, WA (US); Mathew T. DeAngelis, Seattle, WA (US)

(73) Assignee: THE BOEING COMPANY, Chicago, IL (US)

( * ) Notice: Subject to any disclaimer, the term of this patent is extended or adjusted under 35 U.S.C. 154(b) by 0 days.

(21) Appl. No.: 16/238,075

(22) Filed: Jan. 2, 2019

(65) Prior Publication Data

US 2020/0211287 A1 Jul. 2, 2020

(51) Int. Cl.
*G06T 19/00* (2011.01)
*G08G 5/04* (2006.01)
(Continued)

(52) U.S. Cl.
CPC ............ *G06T 19/006* (2013.01); *B64D 45/00* (2013.01); *G01S 7/51* (2013.01); *G01S 17/42* (2013.01);
(Continued)

(58) Field of Classification Search
CPC ........... G06T 19/006; G06T 2219/2004; G06T 2207/10028; G06T 17/05; H04N 13/332; B64D 45/00; B64D 45/04; G01S 7/51; G01S 17/42; G01S 17/993; G01S 17/89; G01S 7/4817; G01S 17/933;
(Continued)

(56) References Cited

U.S. PATENT DOCUMENTS 9,262,932 B1 * 2/2016 Barber ............... G08G 5/0021
9,940,901 B2 4/2018 Luebke et al.
(Continued)

OTHER PUBLICATIONS

NLR—Netherlands Aerospace Centre, Simulation-based concept development and evaluation, Augmented reality concept to improve communication between helicopter crew during firefighting operations, NLR-TP-2015-512 / Jul. 2016, pp. 1-26.
(Continued)

*Primary Examiner* — Xilin Guo
(74) *Attorney, Agent, or Firm* — Coats & Bennett, PLLC

(57) ABSTRACT

A visualization system using mixed reality provides an "extended view" to the pilot or other crew of an aircraft. The extended view enables the user to visualize obstructed objects projected onto the real world scene viewed by the pilot using an optical the see-through display (OSTD) thus providing the user with greater situational awareness. A LIDAR point cloud model of the environment around the aircraft is generated from two or more laser scanning devices providing a 360 degree panoramic view. The combined point cloud model is aligned with the pilot's real world view based on the pilot's "pose" and projected onto the OSTD as an overlay so that the pilot sees the combined point cloud model in relation to the real world as seen by the pilot. One aspect of the invention is that the raw sensor data from the LIDAR devices is displayed on the actual real-world scene as a point cloud without any further image processing to enhance the user's perception.

23 Claims, 6 Drawing Sheets

(51) Int. Cl.
*G09G 3/00* (2006.01)
*H04N 13/332* (2018.01)
*G02B 27/01* (2006.01)
*G01S 17/42* (2006.01)
*G01S 17/933* (2020.01)
*B64D 45/00* (2006.01)
*G01S 7/51* (2006.01)

(52) U.S. Cl.
CPC ........ *G01S 17/933* (2013.01); *G02B 27/0172* (2013.01); *G08G 5/045* (2013.01); *G09G 3/002* (2013.01); *H04N 13/332* (2018.05); *G02B 2027/014* (2013.01); *G02B 2027/0138* (2013.01); *G02B 2027/0141* (2013.01); *G06T 2219/2004* (2013.01)

(58) Field of Classification Search
CPC ........ G02B 27/0172; G02B 2027/0138; G02B 2027/014; G02B 2027/0141; G08G 5/045; G08G 5/0013; G09G 3/002
See application file for complete search history.

(56) References Cited

U.S. PATENT DOCUMENTS

| | | | |
|---|---|---|---|
| 10,304,242 B1 * | 5/2019 | Tiana | ........................ G06T 7/11 |
| 2007/0273557 A1 | 11/2007 | Baillot | |
| 2016/0026253 A1 | 1/2016 | Bradski et al. | |
| 2019/0204449 A1 * | 7/2019 | Yuk | ........................ B64D 47/06 |

OTHER PUBLICATIONS

Qiu, et al., Augmented Vehicular Reality: Enabling Extended Vision for Future Vehicles, HotMobile '17, Feb. 21-22, 2017, Sonoma, CA, USA.

Mori, et al, A Survey of diminished reality: Techniques for visually concealing, eliminating, and seeing through real objects, IPSJ Transactions on Computer Vision and Applications (2017) 9:17, DOI 10.1186/s41074-017-0028-1, Review Paper, Open Access, pp. 1-14.

Lindberg, Panoramic Augmented Reality for Persistence of Information in Counterinsurgency Environments (PARPICE), Naval Postgraduate School, Monterey, California, THESIS, Dec. 2010.

Avery, X-Ray Vision for Mobile Outdoor Augmented Reality, Research Thesis for the Degree of Doctor of Philosophy, Wearable Computer Lab, School of Computer and Information Science, Division of Information Technology, Engineering, and the Environment, University of South Australia, Adelaide, South Australia, May 2009.

* cited by examiner

VISUALIZATION SYSTEM FOR AN AIRCRAFT USING LIDAR POINT CLOUD MODEL

TECHNICAL FIELD

The present disclosure relates generally to aircraft safety and more particularly, to a visualization system for an aircraft using a LIDAR point cloud model to improve the situational awareness of the pilot of an aircraft.

BACKGROUND

Modern commercial aircraft are equipped with sophisticated avionics and computer-assisted controls to help pilots with many common flight operations. Aircraft safety, however, still depends on the pilot's ability to see and react to traffic conditions, both when the aircraft is in-flight and taxiing on the ground. However, visual occlusions caused by vehicle structure around the pilots prohibits them from seeing directly in front and around portions of an airplane. Thus, the pilot may be unaware of objects or persons in the area around the aircraft, which pose potential collision hazards.

SUMMARY

The present disclosure relates to a visualization system using mixed reality to provide an "extended view" to the pilot or other crew of an aircraft. The extended view enables the user to visualize obstructed objects projected onto the real world scene viewed by the pilot using an optical see-through display (OSTD) thus providing the user with greater situational awareness. A LIDAR point cloud model of the environment around the aircraft is generated from two or more laser scanning devices providing a 360 degree panoramic view. The point cloud model is aligned with the pilot's real world view based on the pilot's "pose" and projected onto the OSTD as an overlay so that the pilot sees the point cloud model in relation to the real world as seen by the pilot. One aspect of the invention is that the raw sensor data from the LIDAR devices is displayed on the actual real-world scene as a point cloud without any further image processing to enhance the user's perception.

Another aspect of the disclosure comprises a method implemented by a visualization system on an aircraft to provide an extended view to a pilot of the aircraft of objects in the environment around the aircraft. Two or more laser scanning devices mounted to the aircraft scan the space around an aircraft in three dimensions at least two point cloud data sets of the space. An image processing system generates a combined point cloud model of the space around the aircraft from the at least two point cloud data sets. The combined point cloud model of the space is aligned to a field of view of the pilot and projected onto OSTD worn by the pilot.

Another aspect of the disclosure comprises a visualization system for an aircraft using mixed reality to provide the pilot of the aircraft with an extended view of the environment around the aircraft. The visualization system comprises at least two laser scanning devices mounted to the aircraft, an image processing system, and an OSTD. Each laser scanning device is operative to scan a space around the aircraft in three dimensions using to generate a point cloud data set of the space. The image processing system is operative to generate a combined point cloud model of the space around the aircraft from the at least two point cloud data sets, and to align the combined point cloud model of the space to a field of view of the pilot. The OSTD is configured to be worn by the pilot and is operative to project at least a portion of the combined point cloud model of the space into the field of view of the pilot.

Another aspect of the disclosure comprise an aircraft equipped with a visualization system that provides the pilot of the aircraft with an extended view of the environment around the aircraft. The aircraft includes a fuselage and wings extending from opposing sides of the fuselage. The visualization system comprises at least two laser scanning devices mounted to respective wings of the aircraft, an image processing system, and an OSTD. Each laser scanning device is operative to scan a space around the aircraft in three dimensions using to generate a point cloud data set of the space. The image processing system is operative to generate a combined point cloud model of the space around the aircraft from the at least two point cloud data sets, and to align the combined point cloud model of the space to a field of view of the pilot. The OSTD is configured to be worn by the pilot and is operative to project at least a portion of the combined point cloud model of the space into the field of view of the pilot.

DETAILED DESCRIPTION

Figure 1:
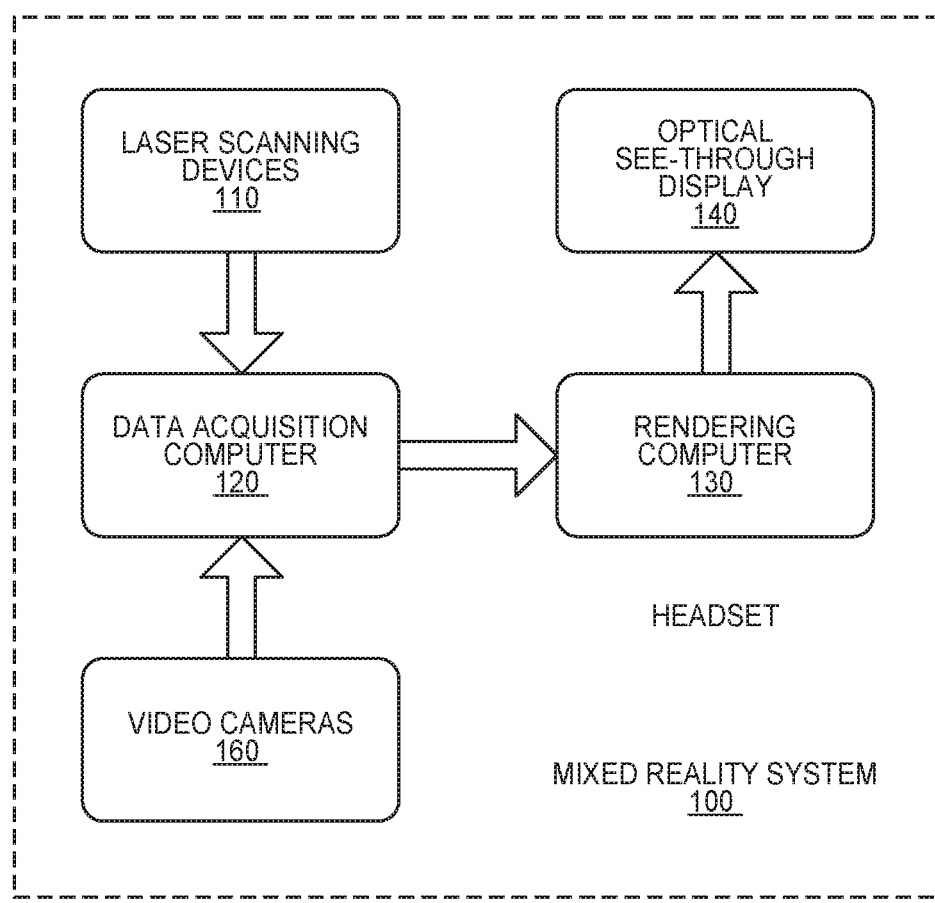
FIG. 1 illustrates one example of a visualization system for an aircraft.

Referring now to the drawings, FIG. 1 illustrates the basic elements of a visualization system 100 for an aircraft 10 (shown in FIG. 2) to provide the pilot or other crew member with an "extended view" of objects in the environment around the aircraft 10. As used herein, the term pilot is used in its broadest sense to include a co-pilot or other person licensed to operate an aircraft 10. The visualization system 100 comprises two or more laser scanning devices 110, an image processing system 115, and a head-mounted (HM) optical see-through display (OSTD) 140 that is worn by the pilot. The laser scanning devices 110 scan the environment around the aircraft 10 and provide real-time data streams comprising raw measurements (e.g., voxel data) to the image processing system 115. The image processing system 115 comprises a data acquisition computer 120 and a rendering computer 130. The data acquisition computer 120 receives the data streams from the laser scanning devices 110 and generates a combined point cloud model of the environment around the aircraft 10 referenced to an aircraft coordinate system. The combined point cloud model is continuously updated in real-time as new data arrives from the laser scanning devices 110. The rendering unit aligns the point cloud model provided by the data acquisition unit with a real world view of the pilot and renders the point cloud model for output to the OSTD 140. The OSTD 140 projects the point cloud model into the pilot's field of view (FOV)

and tracks the pilot's head and eye movement so that the point cloud model stays "locked" to the pilot's FOV. The point cloud model projected into the pilot's FOV enables the pilot to visualize objects that are otherwise obstructed by the structure of the aircraft 10 or other obstructing objects in the environment thus providing greater situational awareness to the pilot. The obstructed objects will appear in the pilot's FOV as point clouds overlaid onto the real world scene.

Figure 2:
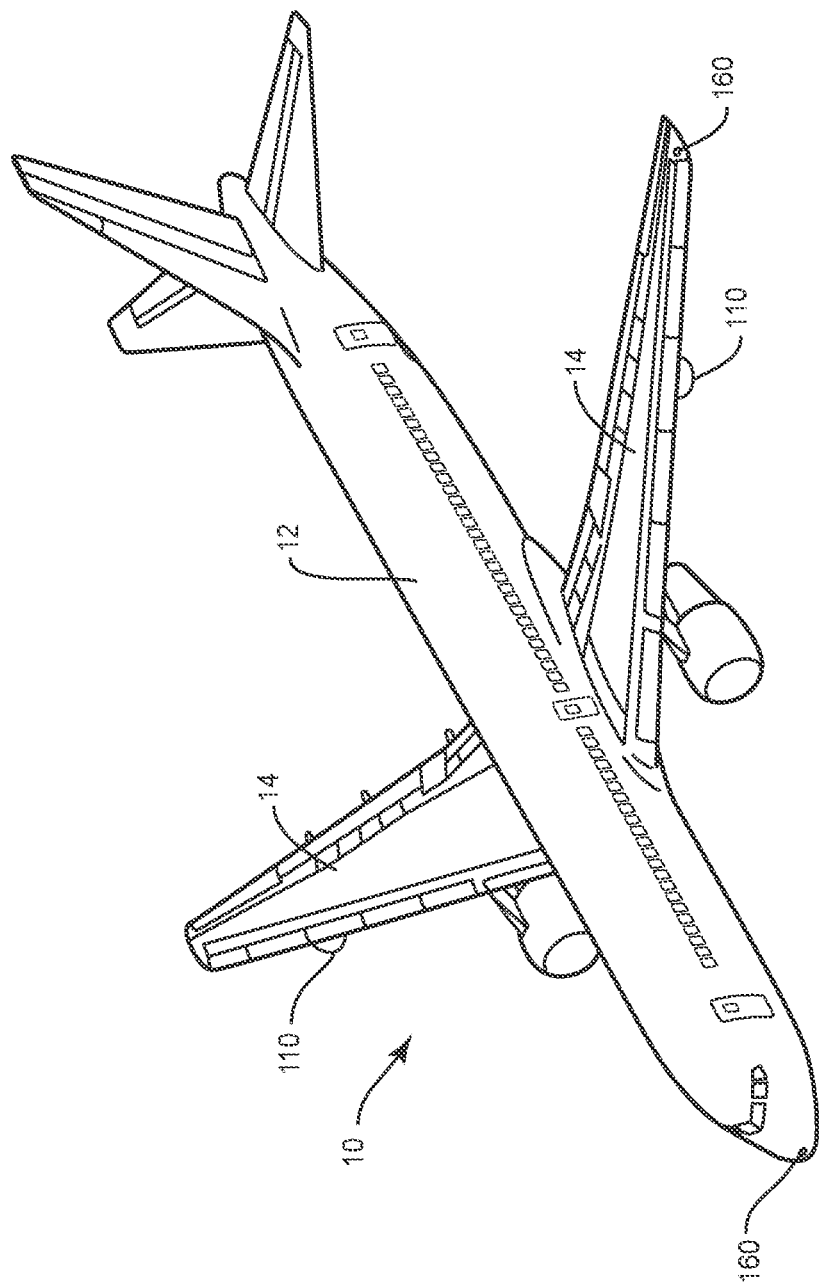
FIG. 2 illustrates an aircraft equipped with a visualization system as herein described.

FIG. 2 illustrates an aircraft 10 equipped with a visualization system 100. The aircraft includes a fuselage 12 and wings 14 extending from opposite sides of the fuselage 12. A laser scanning device 110 is mounted on each wing 14 of the aircraft 10. Each of the laser scanning devices 110 is configured to provide a full 360 degree scan of the environment around the aircraft 10. The laser scanning devices 110 comprise Light Detection And Ranging (LIDAR) devices that measure the distance to objects in the environment by illuminating the objects with pulsed laser light and measuring the reflected pulses with a sensor. The measurements made by the LIDAR devices can be represented in the form of a point cloud, where each point in the cloud represents one distance measurement.

Figure 3:
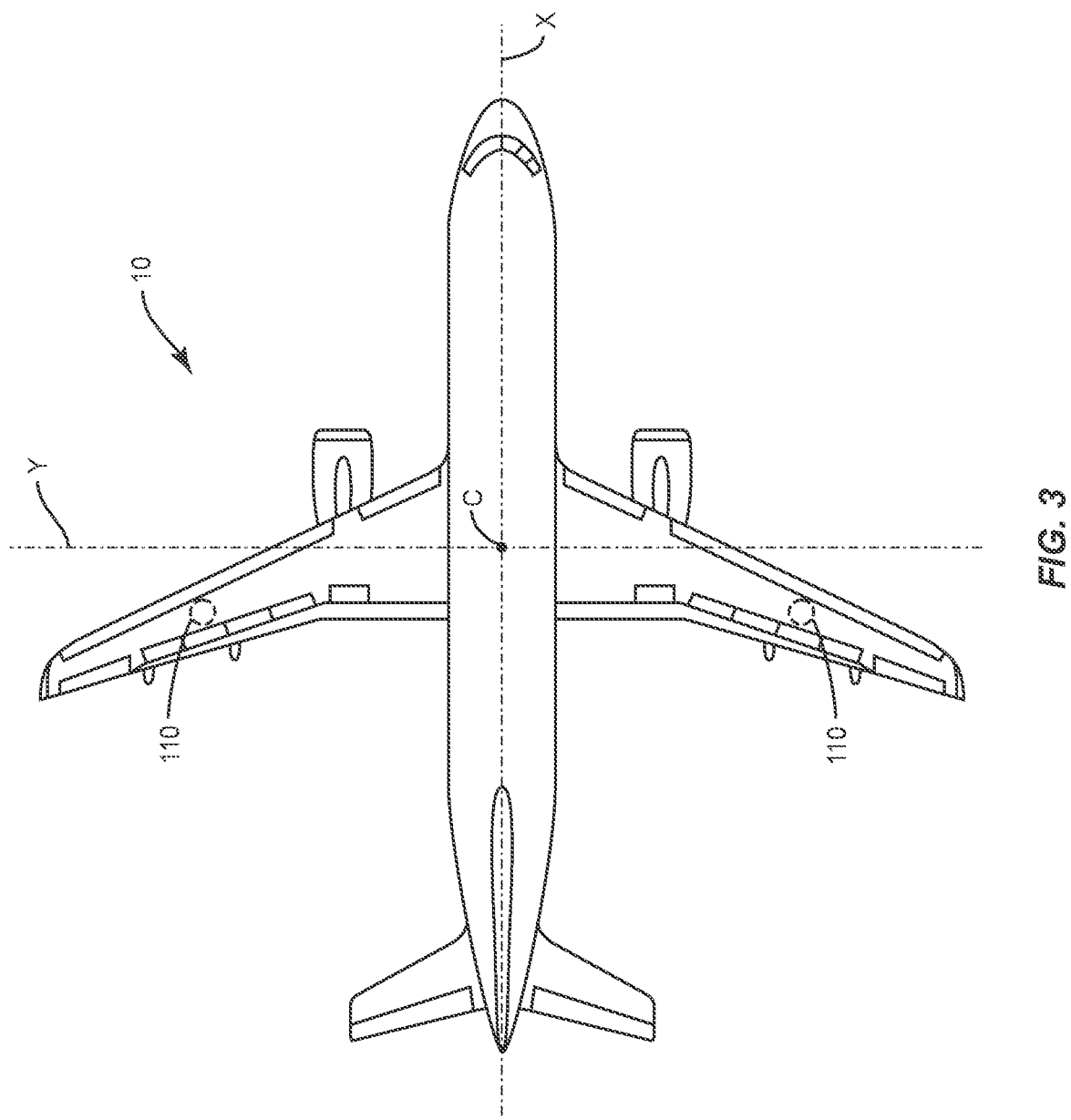
FIG. 3 illustrates an aircraft coordinate system for use by a visualization system.

The data acquisition computer 120 collects the raw sensor data from LIDAR devices and combines the raw sensor data from multiple LIDAR devices into a single combined point cloud model of the environment around the aircraft 10. The combined point cloud model is referenced to an aircraft coordinate system having its origin C along a longitudinal centerline (X) of the aircraft 10 as shown in FIG. 3. In the embodiment shown in FIG. 3, the origin C of the aircraft coordinate system is located along a traverse axis Y extending perpendicularly to the longitudinal axis X. Each laser scanning device 110 has its own internal coordinate system, so the data acquisition computer 120 needs to translate the coordinates provided in the raw sensor data to the aircraft coordinate system. Translating the raw sensor data from multiple laser scanning devices 110 effectively combines the data sets provided by each laser scanning device 110 into a single point cloud model referenced to the aircraft coordinate system.

The rendering computer 130 receives the combined point cloud data set from the data acquisition computer 120 and renders the combined point cloud data model as a collection of discrete points that can be visualized on the OSTD 140. According to one aspect of the disclosure, the each point of the point cloud corresponds to a voxel in the point cloud model. With a sufficient number of points in the point cloud, objects in the environment can be recognized by the pilot of the aircraft 10.

The OSTD 140 comprises a head-mounted, mixed-reality display that uses a transparent visor to superimpose computer-generated images on top of the real world view of the pilot. In the context of the present disclosure, the point cloud generated by the rendering computer 130 is aligned or registered with the real world view of the pilot and projected onto the transparent visor such that the point cloud overlays the real world view as seen by the user. The point cloud enables a full 360 degree view of the environment around the aircraft 10 dependent on a user's pose or viewpoint (i.e., which direction the user is looking). The point cloud enables the user to see objects in the environment otherwise obstructed in the user's FOV by real world objects. These obstructed objects will appear as point clouds overlaid onto the real world scene.

Figure 4:
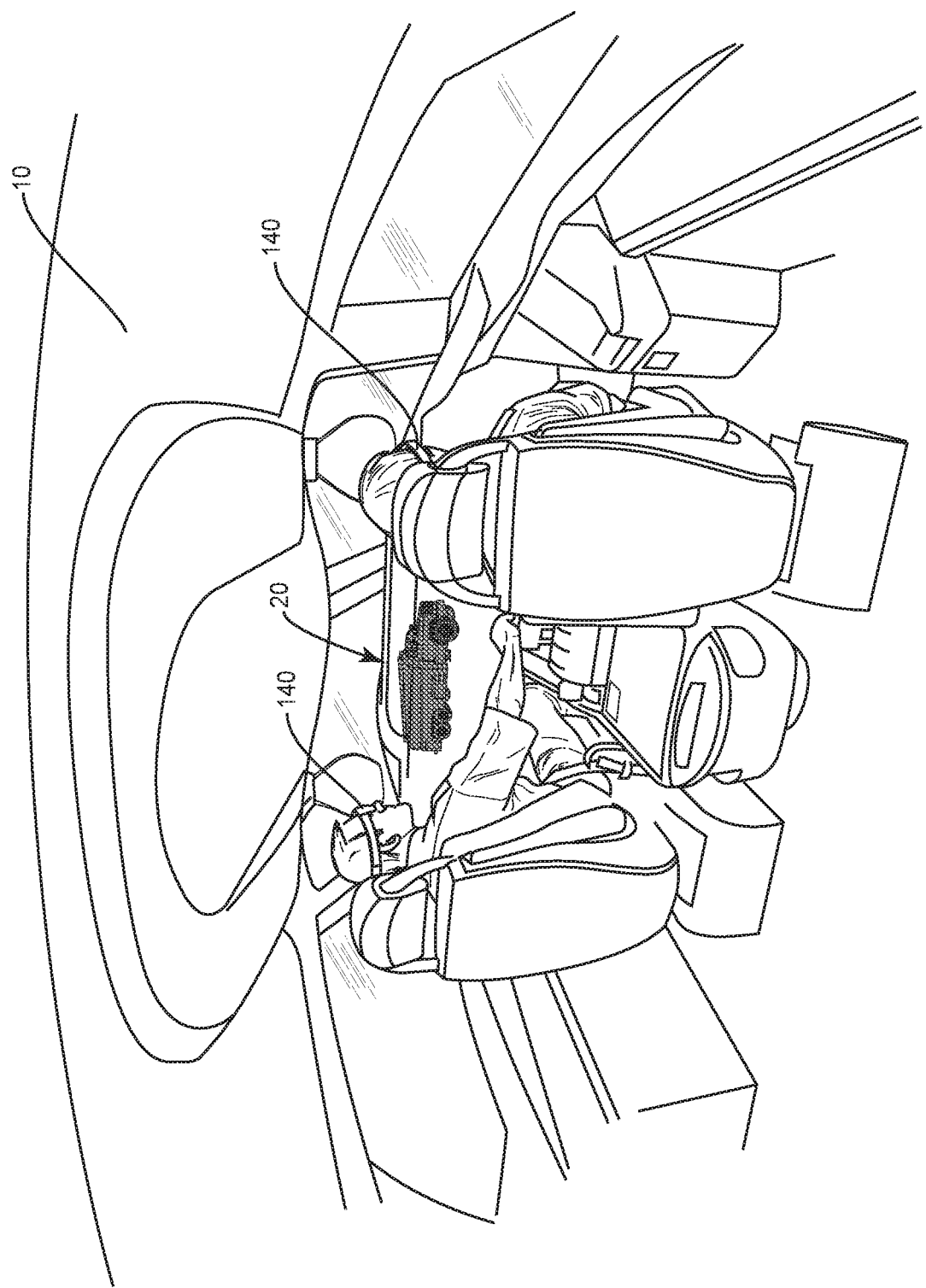
FIG. 4 illustrates a view from inside the flight deck of an aircraft equipped with a visualization system.
Figure 5:
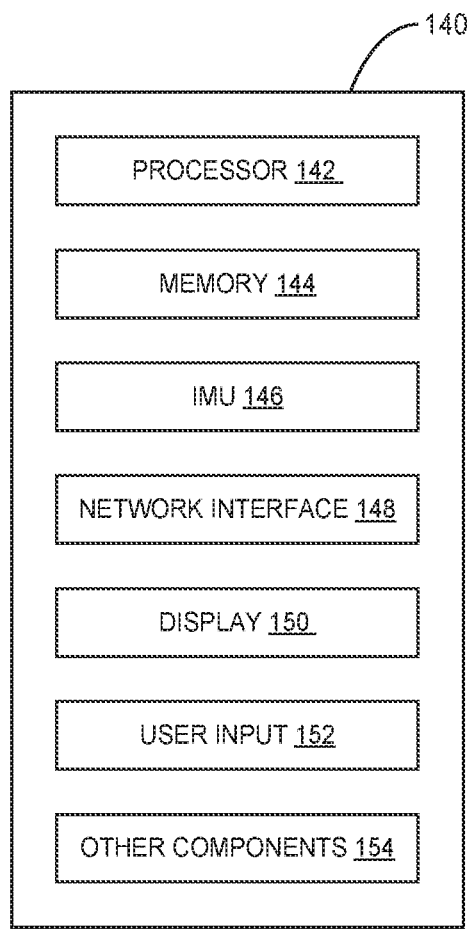
FIG. 5 illustrates an exemplary OSTD for use in a visualization system.

FIG. 4 illustrates a view from inside the cockpit of an aircraft 10. The pilot and co-pilot are provided with an OSTD 140 that enables visualization of objects obstructed from view by the structure of the aircraft 10. In the example shown in FIG. 4, a fuel truck in front of the aircraft 10 is obstructed from the view of the pilot and co-pilot. The fuel truck, however, appears a point cloud 20 overlaid onto the natural view of the pilot FIG. 5 illustrates an exemplary OSTD 140. The OSTD 140 comprises a display 142, built-in computer 144 including a processor and memory, an inertial measurement unit (IMU) 146 for tracking head movement, eye movement cameras 148 for tracking eye movement, a user input 150, and a network interface (e.g., BLUETOOTH and/or WIFI) 152. As noted above, the display 142 may be in the form of a transparent visor onto which computer-generated images are projected. The built-in computer 144 can be programmed to function as the rendering computer 130 for rendering the point cloud model. In other embodiments, the rendering computer 130 may be implemented in a separate computing device that communicates via a wired or wireless interface with the OSTD 140. The IMU 146 tracks the user's head movement so that the projection of the point cloud into the pilot's FOV is locked to and synchronized with the user's head movement. The eye movement cameras 148 track the pilot's eye movement and are likewise used in synchronizing the projection of the point cloud model with the pilot's direction of gaze. The user input 150 enables the pilot to input data and commands into the OSTD 140. The user input 150 may comprise one or more of a voice input, gesture recognition system, touch interface, or mechanical inputs (e.g., buttons). The network interface 152 comprises a wired or wireless interface that enables the OSTD 140 to connect with other devices over a communication network. In this context, a communication network may comprise a direct peer-to-peer connection between the OSTD 140 and another device. The OSTD may include other components 154 which are not material to the present disclosure. The other components 154 may include additional environmental sensors, microphones, speakers, etc.

An exemplary OSTD 140 suitable for use in the visualization system 100 is the MICROSFT HOLOLENS. The MICROSFT HOLOLENS comprises a 32-bit INTEL processor running on a WINDOWS 10 operating system, and a custom designed Holographic Processing Unit (HPU) for graphics processing. The IMU 146 in the MICROSFT HOLOLENS comprises an accelerometer, gyroscope and magnetometer for tracking head movement. The MICROSFT HOLOLENS includes both a BLUETOOTH and WIFI wireless interfaces to communicate with other devices.

In one embodiment, a middleware application, such as the Robotic Operating System (ROS), running on the data acquisition computer 120 implements protocols to communicate with ROS-compatible laser scanning devices 110 and receives the data streams from the laser scanning devices 110. ROS aggregates the data streams collected from multiple laser scanning devices 110 to generate a combined point cloud model, and publishes the combined point cloud model to ROSBRIDGE, a middleware application that provides a JSON Application Programming Interface (API) to ROS functionality for non-ROS programs. A graphics rendering application known as UNITY running on the built-in computer 144 of a HOLOLENS mixed reality display subscribes to the point cloud data published to ROSBRIDGE and renders the point cloud model for display by the HOLOLENS. A one-time calibration is required to align the point cloud to the real world view of the user. The calibration process in effect translates the coordinates of the individual points in the point cloud to a reference coordinate system used by the OSTD 140. In some embodiments, the calibration process is based on the use of fiducial markers, such as QR codes on objects in the environment. A fiducial marker is any object that can be placed in a scene to provide a fixed point of reference for position or scale. The fiducial markers allow the OSTD 140 to correctly align the combined point cloud model with the reference coordinate system of the OSTD 140. In other embodiments, calibration can be based on the pilot's position and head orientation relative to the aircraft coordinate system. Once alignment is obtained, the IMU 146 and eye movement cameras 148 in the HOLOLENS track the user's head and eye movements respectively so that the point cloud projected on the HOLOLENS synchronizes with the movement of the user. The point cloud, which represents objects in the environment, is projected onto the real world scene as viewed by the user so that the user is able to see objects that are obstructed from view by the structure of the aircraft 10 or by other obstructing objects in the environment.

In some embodiments, the projection of the point cloud model into the pilots FOV can be toggled on and off responsive to user input or some triggering events. As an example, the display of the point cloud model can be toggled on and off selectively in different phases of flight operation (e.g., on during take-off and landing, off at altitude). As another example, the display of the point cloud model can be toggled on and off based on the Global Positioning System (GPS) coordinates and/or altitude. In one embodiment, GPS coordinates and altitude sensors are used to determine when the aircraft 10 is on the ground at an airport, during which time the point cloud model is displayed. In these examples, the pilot can manually override any automatic controls.

In some embodiments, the aircraft 10 may also include a vision system comprising one or more video cameras 160 mounted on the nose or wings 14 of the aircraft 10 and/or other selected areas. The video streams generated by the video cameras 160 can also be published to ROSBRDIGE and subscribed to by the UNITY application running on the OSTD's built-in computer 144 and/or rendering computer 130. In some embodiments, the UNITY application is programmed to combine the video feeds from multiple video cameras into a single panoramic view that can be projected onto the pilot's FOV. The UNITY application can allow the pilot or other user to toggle the display between the LIDAR point cloud model and the video feeds from one or more of the video cameras to enable the pilot to see the objects in the environment around the aircraft 10. The toggle control can be responsive to voice commands, hand gestures, or other forms of user input. The video stream generated from one or more video cameras 160 can be displayed by the HOLOLENS in varying levels of transparency so that the real world view is not blocked.

Figure 6:
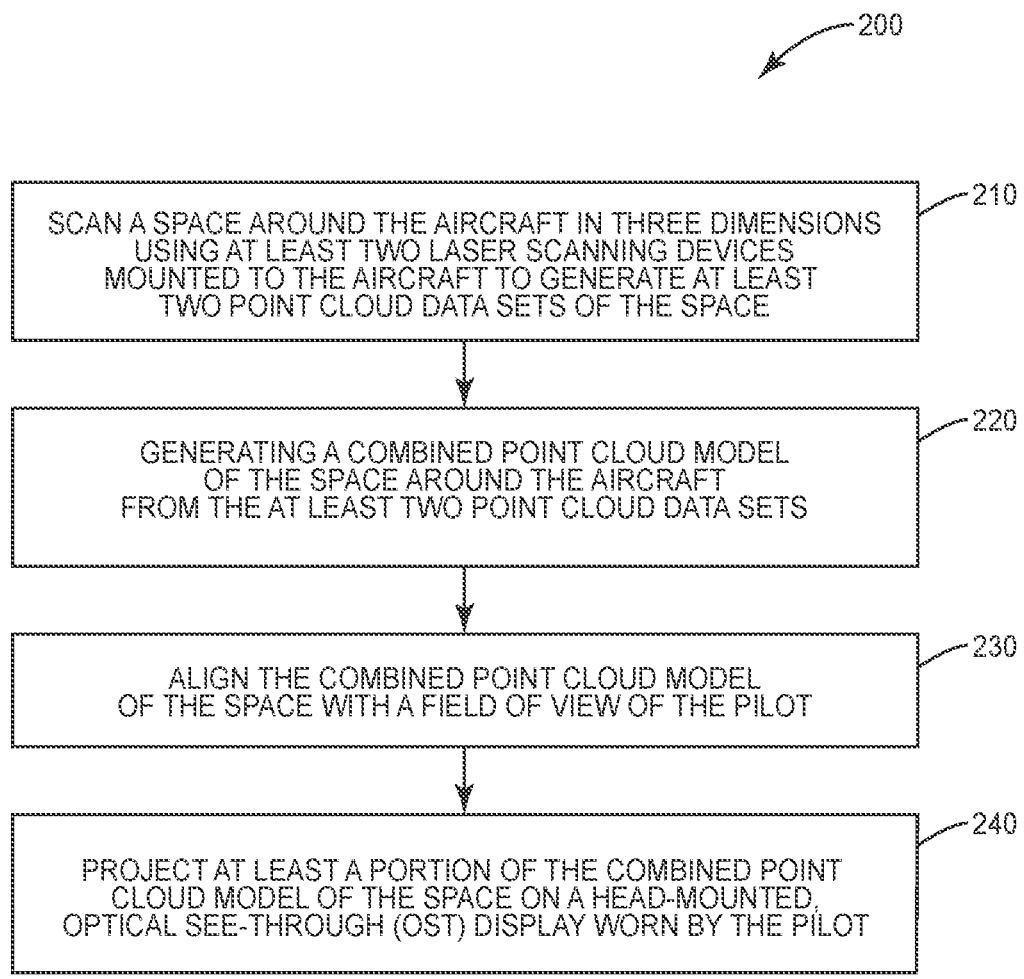
FIG. 6 illustrates a method implemented by the visualization system.

FIG. 6 illustrates an exemplary method 200 implemented by a visualization system 100 for an aircraft 10 to provide a mixed reality view of objects in the environment around the aircraft 10 to a pilot or other crew member. Two or more laser scanning devices 110 mounted to the aircraft 10 scan the space around an aircraft 10 in three dimensions at least two data streams representing the space around the aircraft 10 (block 210). An image processing system 115 generates a combined point cloud model of the space around the aircraft 10 from the at least two point cloud data streams (block 220). The combined point cloud model of the space is aligned to a FOV of the pilot (block 230) and projected at least a portion of the combined point cloud model of the space is projected onto an OSTD 140 worn by the pilot (block 240).

In some embodiments of the method 200, a first laser scanning device mounted to a first wing of the aircraft 10 scans the space around the aircraft 10 to obtain a first point cloud data stream, and a second laser scanning device mounted to a second wing of the aircraft 10 scans the space around the aircraft 10 to obtain a second point cloud data stream.

In some embodiments of the method 200, the first and second point cloud data streams are translated into an aircraft coordinate system to generate the combined point cloud model.

In some embodiments of the method 200, aligning the combined point cloud model of the space to a FOV of the pilot comprises aligning the point cloud model with a reference coordinate system of the OSTD 140. In one example, the point cloud model is aligned with the reference coordinate system of the optical see-through display based on the spatial location and direction of view of the pilot relative to the aircraft coordinate system. In another example, the point cloud model is aligned with the coordinate system of the OSTD 140 based on one or more fiducial markers.

In some embodiments of the method 200, the visualization system 100 determines a spatial occlusion based on relative positioning between an occluding object in the FOV of the pilot and an occluded object based on spatial locations of the objects and the FOV of the pilot. The OSTD 140 projects a point cloud representation of an occluded object over an occluding object in the FOV of the pilot to visualize the occluded object.

Some embodiments of the method 200 further comprise capturing an image of the occluded object with a video camera, and projecting the video image of the occluded object over the occluding object in the FOV of the pilot to enable the pilot to visualize the occluded object.

Some embodiments of the method 200 further comprise selectively toggling between the point cloud representation of an occluded object and the video image of the occluded object. Toggling between the point cloud representation of the occluded object and the image view of the occluded object can be responsive to user input, or performed automatically responsive to an operational condition.

The present disclosure enables a pilot or other crew member to visualize objects that would otherwise be obstructed from view by the structure of the aircraft 10 or by occluding objects in the environment. The ability to visualize occluded objects provides greater situational awareness to the pilot and makes aircraft 10 operations safer.

What is claimed is:

1. A method for presenting a mixed reality view to a pilot of an aircraft, comprising:

scanning a space around the aircraft in three dimensions using at least two laser scanning devices mounted to the aircraft to generate at least two data streams representing objects in the space around the aircraft;

generating a combined point cloud model of the space around the aircraft from the at least two data streams;

aligning the combined point cloud model of the space with a field of view of the pilot; and projecting a portion of the combined point cloud model of the space on a head-mounted, optical see-through display worn by the pilot;

determining a spatial occlusion based on relative positioning between an occluding object in the field of view of the pilot and an occluded object based on spatial locations of the objects and the field of view of the pilot with the occluded object captured when scanning the space around the aircraft using the at least two laser scanning devices; and projecting a point cloud representation of the occluded object over the occluding object in the field of view of the pilot to visualize the occluded object.

2. The method of claim 1 wherein scanning a space around the aircraft in three dimensions comprises:

scanning the space around the aircraft using a first laser scanning device mounted to a first wing of the aircraft to obtain a first point cloud data stream; and scanning the space around the aircraft using a second laser scanning device mounted to a second wing of the aircraft to obtain a second point cloud data stream.

3. The method of claim 2 wherein generating the combined point cloud model of the space around the aircraft from the at least two data streams comprises translating the first and second data streams into an aircraft coordinate system.

4. The method of claim 3 wherein aligning the combined point cloud model of the space to the field of view of the pilot comprises aligning the combined point cloud model with a reference coordinate system of the optical see-through display.

5. The method of claim 4 wherein aligning the combined point cloud model with the reference coordinate system of the optical see-through display comprises aligning the combined point cloud model with the reference coordinate system of the optical see-through display based on a spatial location and direction of view of the pilot relative to the aircraft coordinate system.

6. The method of claim 4 wherein aligning the combined point cloud model with the reference coordinate system of the optical see-through display comprises aligning the combined point cloud model with the reference coordinate system of the optical see-through display based on one or more fiducial markers.

7. The method of claim 1 further comprising:

capturing an image of the occluded object with a video camera;

aligning the image of the occluded object with the field of view of the pilot; and projecting the image of the occluded object over the occluding object in the field of view of the pilot to enable the pilot to visualize the occluded object.

8. The method of claim 7 further comprising selectively toggling the between the point cloud representation of the occluded object and the image of the occluded object.

9. The method of claim 8 selectively toggling the between the point cloud representation of the occluded object and the image of the occluded object comprises toggling between the point cloud representation of the occluded object and the image of the occluded object responsive to user input.

10. The method of claim 8 selectively toggling the between the point cloud representation of the occluded object and the image of the occluded object comprises toggling between the point cloud representation of the occluded object and the image of the occluded object automatically responsive to an operational condition.

11. The method of claim 1, wherein scanning the space around the aircraft in three dimensions using the at least two laser scanning devices mounted to the aircraft comprises scanning the area in front of the aircraft that is visually below the field of view of the pilot.

12. The method of claim 1, wherein scanning the space around the aircraft in three dimensions using the at least two laser scanning devices mounted to the aircraft comprises scanning a full 360 degrees around the aircraft.

13. A visualization system for presenting a mixed reality view to a pilot of an aircraft, comprising:

at least two laser scanning devices mounted to the aircraft, each laser scanning device being operative to scan a space around the aircraft in three dimensions to generate a data stream representing objects in the space around the aircraft;

an image processing system operative to:

generate a combined point cloud model of the space around the aircraft from the data streams;

align the combined point cloud model of the space to a field of view of the pilot;

determine a spatial occlusion based on relative positioning between an occluding object in the field of view of the pilot and an occluded object based on spatial locations of the objects in the point cloud and the field of view of the pilot, the occluded object captured by at least one of the two laser scanning devices;

project a point cloud representation of the occluded object over the occluding object in the field of view of the pilot to visualize the occluded object; and an optical see-through display configured to be worn by the pilot and operative to project a portion of the combined point cloud model of the space into the field of view of the pilot.

14. The visualization system of claim 13 the at least two laser scanning devices comprise:

a first laser scanning device mounted to a first wing of the aircraft to scan the space around the aircraft to obtain a first data stream; and a second laser scanning device mounted to a second wing of the aircraft to scan the space around the aircraft to obtain a second data stream.

15. The visualization system of claim 14 wherein the image processing system is configured to generate the combined point cloud model of the space around the aircraft from the data streams by translating the first and second data streams into an aircraft coordinate system.

16. The visualization system of claim 15 wherein the image processing system is configured to align the combined point cloud model of the space to the field of view of the pilot by aligning the aircraft coordinate system with a reference coordinate system of the optical see-through display.

17. The visualization system of claim 16 wherein the image processing system is configured to align the aircraft coordinate system with a coordinate system of the optical see-through display based on a spatial location and direction of view of the pilot relative to the aircraft coordinate system.

18. The visualization system of claim 16 wherein the image processing system is configured to align the aircraft coordinate system with the reference coordinate system of the optical see-through display by aligning the aircraft coordinate system with the reference coordinate system of the optical see-through display based on based on one or more fiducial markers.

19. The visualization system of claim 13 further comprising at least one video camera to capture an image of the occluded object:

wherein the image processing system is further configured to align the image of the occluded object with the field of view of the pilot; and wherein the optical see-through display is further configured to project the image of the occluded object over the occluding object in the field of view of the pilot to enable the pilot to visualize the occluded object.

20. The visualization system of claim 19 wherein the optical see-through display is further configured to selectively toggle the between the point cloud representation of the occluded object and the image of the occluded object.

21. The visualization system of claim 20 wherein the optical see-through display is configured to toggle between the point cloud representation of the occluded object and the image of the occluded object responsive to user input.

22. The visualization system of claim 20 wherein the optical see-through display is configured to toggle between the point cloud representation of the occluded object and the image of the occluded object automatically responsive to an operational condition.

23. An aircraft including a visualization system comprising:
 a fuselage;
 a pair of wings extending from opposing sides of the fuselage;
 at least two laser scanning devices mounted to respective wings of the aircraft, each laser scanning device being operative to scan a space around the aircraft in three dimensions using to generate a data stream representing objects in the space around the aircraft;
 an image processing system operative to:
  generate a combined point cloud model of the space around the aircraft from the data streams;
  align the combined point cloud model of the space to a field of view of a pilot;
  determine a spatial occlusion based on relative positioning between an occluding object in the field of view of the pilot and an occluded object based on spatial locations of the objects in the point cloud and the field of view of the pilot, the occluded object captured by at least one of the two laser scanning devices;
  project a point cloud representation of the occluded object over the occluding object in the field of view of the pilot to visualize the occluded object; and
 an optical see-through optical see-through display configured to be worn by the pilot and operative to project a portion of the combined point cloud model of the space into the field of view of the pilot.

* * * * *

UNITED STATES PATENT AND TRADEMARK OFFICE
CERTIFICATE OF CORRECTION

PATENT NO. : 10,818,091 B2
APPLICATION NO. : 16/238075
DATED : October 27, 2020
INVENTOR(S) : Nick S. Evans and Matthew T. DeAngelis It is certified that error appears in the above-identified patent and that said Letters Patent is hereby corrected as shown below:

On the Title Page

Item (72), Line 2, delete "Mathew" and insert --Matthew--.

Signed and Sealed this
Twenty-sixth Day of April, 2022

Katherine Kelly Vidal
*Director of the United States Patent and Trademark Office*